Oct. 17, 1933.        O. A. LÖKKE        1,930,880
ELECTRICAL HEATING APPARATUS
Filed Aug. 26, 1930
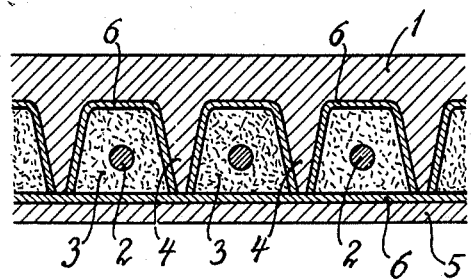
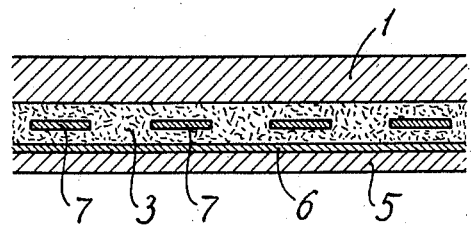
Inventor:-
Ole Adolf Lokke
by Langner Parry Card & Langner
Attys.

Patented Oct. 17, 1933

1,930,880

UNITED STATES PATENT OFFICE 1,930,880

ELECTRICAL HEATING APPARATUS

Ole Adolf Lökke, Nordstrandshogda, near Oslo, Norway, assignor to A/S Elektrisk Bureau, Oslo, Norway Application August 26, 1930, Serial No. 477,841, and in Norway May 10, 1929

2 Claims. (Cl. 219—37)

In electrical heating apparatus, cooking plates, ovens or the like in which the heating or incandescent wire is embedded in insulating material, such as cement, and so is supported in slots or grooves formed in the heat distributing body, which in general consists of iron, it is known that electrolytic action results from the mass of insulation partly owing to the fact that upon these substances being subjected to a rise in temperature ions are liberated as the result of the heat given out by the incandescent wire, and partly owing to the fact that the mass absorbs moisture. It is specially this last named fact that has heretofore been found inconvenient and troublesome owing to the mass becoming a conductor upon the current being switched on with the plate in cold condition and so resulting in danger incidental to electric shocks which, under favourable conditions, may be of a serious character and endanger life. Moreover, the electrolytic action has also an unfavourable influence on the life of the heating apparatus.

The object of the present invention is to prevent the above mentioned electrolytic action of the insulating material by bringing about certain conditions arising from the following consideration.

It is understood that in connection with ordinary heating plates and the like local galvanic currents are generally accepted as unavoidable, especially when the insulating material has the tendency to become damp and so act as an electrolyte between the incandescent wire and the heat distributing body. If, for example, this body is composed of cast iron, the galvanic current will have such a character that the ions will separate atoms from the wire, or the surface of the wire will be gradually converted into hydroxide or such like, and be consumed. This discovery is a piece of new knowledge which at the same time points the way that must be taken in order to prevent the destruction of the wire.

This can be done by means of distributing body being composed of aluminum, magnesium, manganese or some other metal which is more electronegative than the heating wire. In a more general way however, the means in order to prevent the destruction of the wire, may be expressed in the following manner:—

It is suggested that a galvanic element be formed in the heating apparatus, i. e. between the current-consuming electrical heating body (generally a wire) as the one electrode, and the heat distributing body (generally a cast iron plate), or a portion thereof as the opposite electrode, the intermediate mass or layer of insulating material being considered as the electrolyte. Now, according to the present invention, this galvanic element is made with a special constitution by such a selection of the material of the distributing body or of the portion thereof facing towards the insulating material (wire coating) that under the influence of the galvanic current the heating body on the side facing towards said material is not subjected to chemical changes or does not tend to form different chemical compounds.

The simplest form of execution is attained if the distributing body, as well as the other parts necessary for the construction of the apparatus which come into direct contact with the insulating mass are provided with a suitable lining, or are made of a structural material which has the property of forming with the heating wire through the insulating mass a galvanic element of such a character as to prevent the dissolution of the heating wire. This lining or this structural material will then have the property of being transformed during the flow of the current, but without the heating wire being consumed. Some linings are only dissolved with difficulty, but in spite of this they prevent the destruction of the heating wire.

The material, the employment of which has been found to give good results when used in combination with iron bodies, is aluminum.

In the drawing:

Fig. 1 is a vertical cross-section of one form of the invention.

Fig. 2 is a vertical cross-section of a modification in which the resistor is partially surrounded by a metallic lining.

Referring to Fig. 1 of the drawing, 1 denotes the heat distributing body preferably of iron, 2 the heating wire, preferably of chrome-nickel, and 3 the insulating mass arranged between the wire and ribs 4 forming part of the body 1 and forming pockets for receiving the parts 2 and 3. 5 is a plate closing the said pockets and connected with body 1 in any suitable manner (not shown). 6 is the lining preferably of aluminum, arranged on the surfaces of the pockets and of the plate 5 facing the mass 3.

One can, however, use any kind of metal or any kind of alloy which is more electro-negative than the heating wire employed, provided it has the above mentioned qualities as a lining. As examples, in addition to aluminum, one may mention magnesium, chromium and manganese. Instead of providing a lining, the distribution body itself, or a material portion thereof, may consist of one of the above mentioned metals or of an alloy thereof. In this case, I may make the body 1 of one of the said metals or alloys and dispense with the lining 6.

The importance of such a lining is evident from one following which is the result of a practical experiment. Two heating apparatus were formed, in all respects alike, with the only exception that in the one apparatus the iron surfaces in contact with the insulating mass were sprayed with metallic aluminum, whereas the iron in the other apparatus stood in direct contact with the insulating mass. Each apparatus was erected in the same way above a vessel with water. By a level container standing outside which was connected with the water vessels by rubber hose-pipes, the water was kept at the same height below the two apparatus. As soon as the current was switched into the apparatus the heat generated therein developed steam from the water. This steam penetrated the insulating material, and made it electrically more conductive. As soon as the apparatus had cooled, the electrolytic action began, whilst in accordance with the official regulations, the apparatus were earthed. The apparatus were kept for 7 hours a day under steam and heat, and during the remainder of the day and night they were left to the action of the earth current. After a test period of 35 days duration, the two apparatus were opened and examined. It then appeared, as assumed, that in the case of the apparatus not provided with aluminum lining, the heating wire was to such an extent consumed and porous, that it could be almost pulverized between the fingers. On the other hand in the apparatus fitted with aluminum lining, the wire was still in good condition, without showing the slightest sign of consumption or corrosion.

The usual drawback that iron oxide penetrates into the insulating material and in this way destroys the apparatus is completely eliminated in the manner indicated above. But in addition to this the conveyance of the above mentioned lining into the mass even brings about a better preservation of the insulating material and the maintenance of the heating wire from deterioration.

In the above mentioned experiment the aluminum lining proved to be somewhat oxidized and the resistance had been slightly increased.

Of course the heating body need not always be a wire. Other forms of heating bodies may also be in question.

Figure 2 shows a heating body 7 in the form of ribbons embedded in the insulating mass 3 between an upper heat distributing body 1 made of iron alloyed with a suitable content of aluminum and a lower closing plate 5 of metal, ceramic mass, porcelain, etc. provided with a lining 6 of aluminum. The plate 5 may also be made of asbestos or another material preventing for the most the transmission and downward radiation of the heat.

No claim is made in respect of the known arrangement in which the electrical heating plate consists of two connected and superposed flat plates of aluminum (with or without small quantities of other additions) a naked heat resistance inserted between these plates and a heat conducting electrically insulating oxide layer between plates and resistance.

I claim:

1. Electrical heating apparatus comprising a heat distributing body, a current-consuming electrical heating body and an intermediate insulating mass, a lining being provided on the distributing body on the parts facing towards the insulating mass, said lining being made of aluminum and the heating body being made of a material less electro-negative than aluminum.

2. Electrical heating apparatus comprising a heat distributing body, a current-consuming electrical heating resistance, an intermediate insulating mass, and a lining provided on the parts of the distributing body facing towards the insulating mass, said lining being made of a metal which is more electro-negative than the heating resistance, for the purpose of preventing ions of the resistance from travelling out under the influence of electrolytic currents between said resistance and the distributing body, the resistance being thereby conserved.

OLE ADOLF LÖKKE.